United States Patent [19]
Barefoot

[11] Patent Number: 6,073,481
[45] Date of Patent: Jun. 13, 2000

[54] ATTACHMENT FOR SAMPLING PURGE GAS PRESSURE AT WELD SITE

[76] Inventor: Byron G. Barefoot, 8432 Quarry Rd., Manassas, Va. 20110

[21] Appl. No.: 09/233,669

[22] Filed: Jan. 19, 1999

[51] Int. Cl.[7] .............................. G01M 3/04; G01M 3/26; B23K 9/167
[52] U.S. Cl. ..................................... 73/49.5; 73/46; 73/37
[58] Field of Search ................................ 73/49.5, 37, 40, 73/46

[56] References Cited

U.S. PATENT DOCUMENTS

| | | | |
|---|---|---|---|
| 2,255,921 | 9/1941 | Fear | 73/51 |
| 3,877,293 | 4/1975 | McKeage | 73/49.1 |
| 3,958,451 | 5/1976 | Richardson | 73/67.85 |
| 4,185,492 | 1/1980 | Hauk et al. | 73/46 |
| 4,282,743 | 8/1981 | Pickett | 73/46 |
| 4,727,749 | 3/1988 | Miller et al. | 73/46 |
| 4,783,988 | 11/1988 | Bao et al. | 73/46 |
| 4,876,884 | 10/1989 | Jansch | 73/49.1 |
| 5,127,260 | 7/1992 | Robertson | 73/37 |
| 5,209,105 | 5/1993 | Hasha et al. | 73/49.1 |
| 5,448,907 | 9/1995 | Jensen et al. | 73/38 |
| 5,705,736 | 1/1998 | McCranie | 73/37 |
| 5,864,111 | 1/1999 | Barefoot | 219/61 |

Primary Examiner—Hezron Williams
Assistant Examiner—J. David Wiggins
Attorney, Agent, or Firm—Harold H. Dutton, Jr.

[57] ABSTRACT

A method and device for sampling the pressure of inert purge gas flowing in two pipes to be welded at a joint comprising a sleeve for encircling the pipes during their coaxial alignment in end to end abutment, and an associated element with the sleeve forming a sealed chamber surrounding the joint and receiving gas that leaks out from the joint at the same pressure as the gas in the pipes, and a connection for connecting the chamber for measuring the pressure of the gas therein as an indication of the pressure of the gas flowing in the pipes; the method includes clamping the device around the pipes or sliding the pipes into the device.

14 Claims, 1 Drawing Sheet

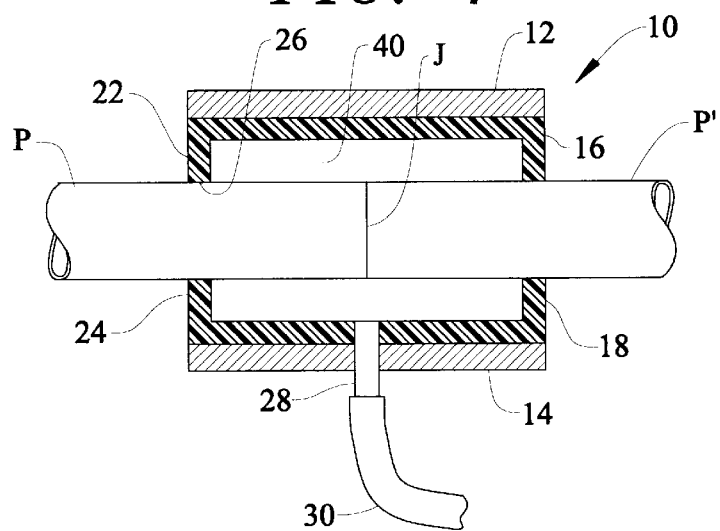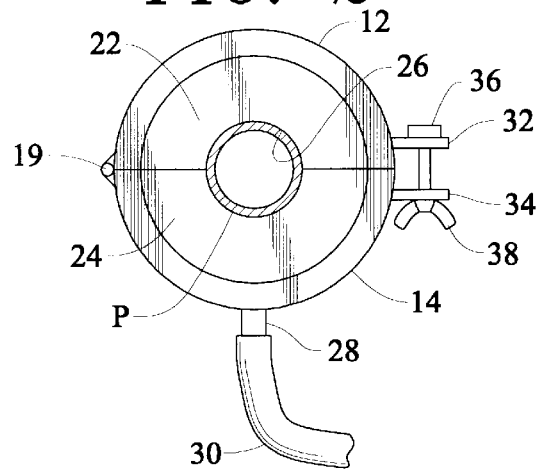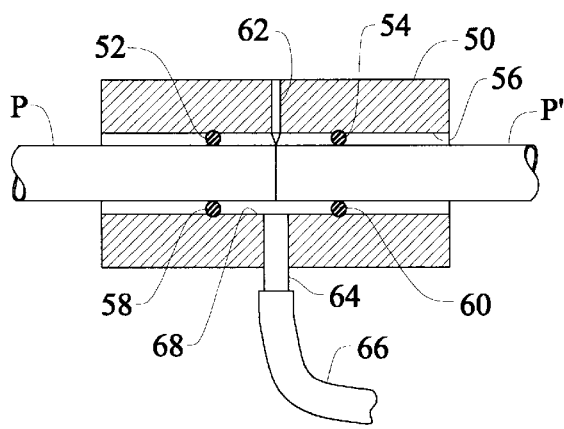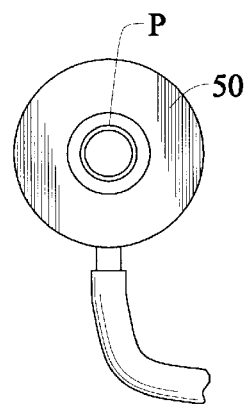

6,073,481

ATTACHMENT FOR SAMPLING PURGE GAS PRESSURE AT WELD SITE

This invention relates to an attachment for sampling an inert purge gas pressure at a weld site. More particularly, the invention relates to an attachment which may be used with an orbital welding apparatus for measuring the pressure of an inert purge gas flowing in a pipeline to be welded.

BACKGROUND AND OBJECTS OF THE INVENTION

Orbital welding machines have become quite popular for welding pipelines, and especially for the welding of stainless steel pipelines as are commonly run in large plants, such as plants for manufacturing semiconductors. Stainless steel pipelines are used to carry a great variety of gaseous and liquid materials through a plant, and the construction of such pipelines requires the welding of a large number of fittings and long lengths of high purity stainless steel pipe. The quality of weld required in such applications mandates a reproducible weld of uniformly high quality, and orbital welding machines have been developed for just such applications.

Orbital welding machines rely upon an essentially constant flow of an inert purge gas flowing through the pipeline at a low, but constant pressure. However, in order to maintain a constant pressure of the gas, a very precise measuring technique is required. Commonly a low pressure gauge known as a Magnehelic gauge is used, and provides a visual indication of pressures ranging from about zero to about 10 inches of water. Most often, such gauges are connected to the pipeline being welded by means of a simple T-fitting temporarily inserted into the pipeline, with the stem of the fitting being connected by a piece of tubing or hose directly to the gauge. At one end the pipeline is connected to a source of inert gas such as a gas cylinder, while the other end of the pipeline has a restrictor to reduce the size of the open end and provide a constant back pressure to the flowing inert gas.

Experience has shown that while a good reading of the pressure may be obtained using a T-fitting, and a constant pressure can be maintained by closely watching the Magnehelic gauge, variations in the pressure in the pipeline nonetheless do occur, and cause problems with the quality of the weld. Moreover, the length of pipeline between the source of the gas and the restrictor varies from one weld to the next, and constant monitoring of the pressure is needed. Moreover, as a weld progresses around the circumference of the pipeline or fitting, the gap between the two ends being welded is gradually closed, and the escape of gas through the butted ends of pipe gradually diminishes until the weld is completed. Since there is inherently some loss at the butted ends, there is a gradual increase in the gas pressure in the pipeline until the weld is completed. Under some conditions, if the pressure is not properly controlled as the weld progresses, the pressure can rise sufficiently to blow through the weld.

Further, the greater the distance between the weld site and the T-fitting, the more likely is the weld to blow through.

The use of T-fittings performs satisfactorily in many applications, however a number of problems are also introduced by using such fittings for measuring the pressure of the inert gas. For example, the use of T-fittings also requires the removal and replacement of the T-fitting after a weld is completed and in preparation for the next weld. This can be not only time consuming, but allows for the introduction of impurities into the pipeline as the fitting is reused, or lays around a job site until it is re-used. The purity of the pipeline and the weld and welding process are of major importance in many plants, in particular in semi-conductor plants where very small amounts of trace elements can cause unacceptable variations in quality control. Thus, each time a T-fitting is reused, an additional possibility of contamination arises.

Additionally, since the T-fitting is installed in the pipeline, it is generally installed downstream of the weld site at the location of the next weld, however the distance will usually vary between welds, such that the distance between the weld site and the T-fitting will no be constant from one weld to the next. As a result, more fluctuations in the purge gas pressure will occur requiring still further compensation in the gas pressure.

Accordingly, a primary object of the present invention is to provide a device for sampling the purge gas pressure at a weld site.

Another object of the invention is to provide a device for sampling the pressure of a purge gas flowing in a pipeline without introducing an additional fitting into the pipeline.

A further object of the invention is to provide a device for sampling the purge gas pressure flowing in a pipeline at the site being welded by an orbital welding machine.

Still another object of the invention is to provide a device for sampling the pressure of a purge gas flowing in a pipeline which may be quickly and easily attached to and removed from the pipeline.

Yet another object of the invention is to provide a device for sampling the pressure of a purge gas flowing in a pipeline being welded which minimizes the likelihood of introducing impurities into the pipeline.

These and other objects and advantages of this invention will become apparent from a detailed consideration of the following description and claims.

DESCRIPTION OF THE INVENTION

The device according to the present invention is intended to connect to the pipeline at the site of the weld, and to sample the leakage inherent at the weld site by creating a sealed chamber enclosing the weld site but in fluid communication with the flowing purge gas through the inherent leakage at the butt joint of the two pipe ends being welded. When the two pipes are prepared for welding, their ends are squared as precisely as possible, and cleaned to remove any burrs or foreign material, but even so, some inert gas passes between the two butted pipe ends. By providing seals with the exterior of the pipe both upstream and downstream of the weld site, an annular chamber is formed into which the purge gas leaks, and at the same pressure as is found on the interior of the pipeline. The seals ensure that the gas does not escape from the chamber. The chamber is also connected to a pressure gauge such as a Magnehelic in order to sample the pressure of the flowing gas and adjust the pressure if necessary.

In a preferred technique, the chamber may be connected to a weld pressure monitoring system such as described in my U.S. Pat. No. 5,864,111 issued Jan. 26, 1999.

In one embodiment, the sampling device is formed of two semi-cylindrical half-shells, each of which contains half of a seal member, so that when the two half-shells are clamped around the pipeline, the seal members form two spaced seals with the exterior wall of the pipeline, with the pipe joint positioned between the two seals. In this manner, a sampling chamber is defined by the two seals forming the ends of the chamber, the wall of the pipe forming the inner wall of the chamber, and the inner wall of the half-shells forming the outer wall of the chamber. The two half-shells may be secured in position by any suitable clamping mechanism. For example, the half-shells may be connected by a hinge on one side and secured by a simple clamp mechanism opposite the hinge. Alternatively, the two half-shells may be secured to the jaws of a clamping hand tool or plier for quick, easy attachment. The device may also be used in the fixture block of the orbital welding system for use during setup and prior to the actual welding.

A suitable fitting is secured in one of the half-shells for fluid communication with the sampling chamber and extends through the wall of that one half-shell for connection to a hose which in turn connects to the gauge or pressure compensating system.

In another embodiment of the invention, the sampling device is formed by a cylindrical sleeve having an internal cylindrical bore and provided with a pair of O-rings housed in the wall of the cylindrical bore. The internal diameter of the sleeve and the O-rings are sized according to the diameter of the pipe being welded, such that the chamber is defined by the outer wall of the pipeline, the inner wall of the sleeve, and the two O-rings which are in contact with both the inner wall and the pipe-line. One or more, preferably three, radially oriented centering pins are provided in the wall of the sleeve, and one of the pieces of pipe to be welded is inserted into the sleeve until it contacts the pin(s). Then the other piece of pipe is inserted until it contacts the pin too. Again, a fitting in the sleeve communicates the chamber to a hose connected to a gauge for measuring and adjusting the gas pressure, or to a pressure compensating system as described in my U.S. Pat. No. 5,864,111.

In each case, the pressure measuring, adjustment and compensation takes place at the site of the weld being made, in order to maximize the accuracy of the measurement. Moreover, since all connections are external of the pipeline, a significantly enhanced purity is achievable by using the present invention.

DESCRIPTION OF THE DRAWINGS

The invention will now be described in greater detail with reference to the accompanying drawings which show the invention by way of non-limiting examples, and in which:

FIG. 1 is a longitudinal cross-sectional view of one embodiment of the present invention;

FIG. 2 is an end view of the device of FIG. 1;

FIG. 3 is a longitudinal cross-sectional view of another embodiment of the invention; and FIG. 4 is an end view of the device of FIG. 3.

DETAILED DESCRIPTION OF PREFERRED EMBODIMENTS

Referring to FIGS. 1 and 2, the pressure sampling device is generally designated 10 and is seen to include two, semi-cylindrical half-shells 12 and 14 which are hingedly joined by a hinge 19 on one side. The half shells are preferably machined steel tubular pieces, and each includes one-piece seal members 16, 18 which may be bonded to the interior of the half-shells 12 and 14. The seals 16, 18 conform to the interior wall of the half shells 12, 14, and include at each end annular, inwardly projecting portions 22, 24 which form a circular opening 26 conforming to the outside diameter of the pipe being welded. The seals 16, 18 are molded from a silicone or other suitable rubbery elastomeric, and when the half-shells are clamped around the pipe, the seals for a gas tight seal.

A suitable clamping mechanism is provided for securing the two half-shells in position on a pipeline. In the simplest example, flanges 32, 34 may extend from each of the half-shells, and a clamping bolt 36 passes through both flanges 32, 34 and is secured by a wing nut 38. Other clamping arrangements may be provided, such as an opposed jaw plier having one of the half shells secured to each jaw. Or, the half-shells may be incorporated into a clamp-on type of weld fixture block. The sampling devices can be made in different internal sizes to fit different pipes. In addition, multiple different size sampling devices for different size pipes can be constructed in a single fixture with a single hinge and a single clamp, in order that the proper sampling device is selected according to the size of pipe.

One of the half-shells (14) is provided with a nipple 28 which is open at each end, and which receives one end of a hose 30. The other end of the hose 30 is attached to a pressure gauge such as a Magnehelic (not shown), and the device can be used with the compensating system shown in my prior U.S. Pat. No. 5,864,111.

The pieces of pipe P, P' to be welded are brought to end to end abutting contact at a butt joint J which is the weld site. The pipes P, P' are clamped in position in fixtures (not shown) in preparation for the welding to take place. Once the pipes P, P' are clamped in position, the half-shells 12, 14 are clamped around the butted ends of the pipes, in order that the joint J is enclosed in a chamber 40. In the embodiment of FIGS. 1 and 2, the chamber is formed and closed by the outer walls of the pipes, the interior walls of the seals 16, 18 and the end flanges 22, 24 of the seals 16, 18. Inert purge gas flowing through the pipe P, P' leaks from the joint J, and the pressure of this gas can be measured by the pressure gauge. The pressure may then be adjusted according to the welding requirements, and once it is adjusted, the sampling device 10 is removed from the pipeline, and the weld head is installed for the welding operation.

In the embodiment shown in FIGS. 3 and 4, a single cylindrical sleeve 50 is provided, and the sleeve 50 has an interior bore sized in order to easily accommodate the pipes being welded, as the pipes will be inserted into the open ends of the sleeve. A pair of spaced, semi-circular grooves 52, 54 are machined in the interior wall 56 of the sleeve 50. These grooves are of a size to accommodate a pair of O-rings 58, 60 which are positioned in the grooves, and project radially inwardly from the wall 56. A centering pin 62 is inserted radially into the sleeve 50, and projects slightly into the interior of the sleeve 50. In addition, a nipple 64 is provided in the wall of the sleeve 50 for connection to a pressure gauge (not shown) by means of a hose 66.

The pieces of pipe P, P' to be welded are inserted into opposite ends of the sleeve 50, each being inserted until it contacts the stop pins. The presence of the stop pins allows each pipe to be inserted such that the abutment of the ends is substantially central to the sleeve 50 and is located between the two O-rings 52, 54. Thus, a chamber 68 is formed by the outer wall of the pipe P, P', the interior wall 56 of the sleeve 50, and the two O-rings 52, 54. The stop pins cause a slight but uniform amount of leakage at the joint, and the pressure of the gas in the pipeline will be equal to the pressure in the chamber 68, which can then be measured by a pressure gauge and adjusted in preparation for welding. After setup, the sleeve may be removed, once the pressure of the flowing inert gas has been set. Any wear in the O-rings may be easily corrected by simply replacing the O-rings.

While this invention has been described as having certain preferred features and embodiments, it will be understood that it is capable of still further variation and modification without departing from the spirit of the invention, and this application is intended to cover any and all variations, modifications and adaptations of the invention as may fall within the spirit of the invention and the scope of the appended claims.

I claim:

1. A device for sampling the pressure of an inert purge gas flowing in two axially aligned abutting pipe members to be welded together at a wall joint comprising sleeve means for encircling a portion of each of said gipe members adjacent the wall joint to be formed, and seal means associated with the sleeve means for forming a sealed chamber between the pipe members and the sleeve means surrounding the joint and receiving gas escaping between the ends of the pipe members into said sealed chamber at the same pressure as the gas in the pipes, and means for connecting said chamber to a pressure measuring device for measuring the pressure of the gas therein as an indication of the pressure of the inert purge gas flowing in the pipes.

2. A device for sampling the pressure of gas flowing in two pipes as in claim 1 and wherein said seal means extends between said sleeve means and the pipes to be welded.

3. A device for sampling the pressure of gas flowing in two pipes as in claim 2 and wherein said seal means comprises an elastomeric seal.

4. A device for sampling the pressure of gas flowing in two pipes as in claim 2 and wherein said sleeve comprises a pair of half-shells and said seal means comprises a pair of molded elastomeric seal members on the inside of said half-shells.

5. A device for sampling the pressure of gas flowing in two pipes as in claim 2 and wherein said half-shells are pivotally connected.

6. A device for sampling the pressure of gas flowing in two pipes as in claim 4 and wherein said seal members each comprises a cylindrical portion conforming to the interior walls of said half-shells, and radially inwardly projecting flanges at the ends of said half-shells for contacting the pipes to be welded.

7. A device for sampling the pressure of gas flowing in two pipes as in claim 5 and including means for clamping said half-shells in position around a pipe.

8. A device for sampling the pressure of gas flowing in two pipes as in claim 2 and wherein said sleeve comprises a cylindrical member having interior and exterior walls and a pair of spaced, semicircular grooves formed in the interior wall of said sleeve.

9. A device for sampling the pressure of gas flowing in two pipes as in claim 8 and including an O-ring positioned in each of said grooves and having a size such as to sealingly contact the pipes being welded when positioned in said sleeve, and forming said sealed chamber with said pipes and the interior wall of said sleeve.

10. A device for sampling the pressure of gas flowing in two pipes as in claim 9 and including a centering pin projecting radially through said sleeve into the interior of said sleeve so as to be contacted by pipes inserted into said sleeve.

11. A device for sampling the pressure of gas flowing in two pipes as in claim 10 and including a fluid conduit leading from said chamber to a pressure measuring device.

12. A method for determining the pressure of inert purge gas flowing in pipes to be welded comprising positioning two pipes in axially aligned end-to-end abutment so that the pipes abut at the joint to be welded, applying a circumferential member around said pipes and forming a sealed chamber around said joint, said sealed chamber receiving purge gas escaping from between the abutting ends of the pipes prior to the welding operation, providing fluid communication from said chamber to a measuring device, and measuring the pressure of the purge gas in said sealed chamber by means of said measuring device as an indication of the pressure of the purge gas flowing in said pipes.

13. A method for determining the pressure of inert gas flowing in pipes being welded as in claim 12 and including applying said circumferential member by clamping a pair of half-shells around said pipes.

14. A method for determining the pressure of inert gas flowing in pipes being welded as in claim 11 and applying said circumferential member by inserting each of the pipes to be welded into axially aligned opposite ends of said circumferential member.

* * * * *

UNITED STATES PATENT AND TRADEMARK OFFICE
CERTIFICATE OF CORRECTION

PATENT NO. : 6,073,481
DATED : June 13, 2000
INVENTOR(S) : Byron G. Barefoot

It is certified that error appears in the above-identified patent and that said Letters Patent is hereby corrected as shown below:

Column 5,
Line 11, chane "gipe" to -- pipe --.

Signed and Sealed this

Second Day of July, 2002

Attest:

JAMES E. ROGAN
Attesting Officer    Director of the United States Patent and Trademark Office